United States Patent

Sakuma et al.

[11] Patent Number: 5,877,235
[45] Date of Patent: Mar. 2, 1999

[54] AQUEOUS INK

[75] Inventors: Tadashi Sakuma, Tochigi; Tetsuya Ueno; Kuniyasu Kawabe, both of Wakayama, all of Japan

[73] Assignee: Kao Corporation, Tokyo, Japan

[21] Appl. No.: 849,729

[22] PCT Filed: Oct. 25, 1996

[86] PCT No.: PCT/JP96/03128

§ 371 Date: Jun. 30, 1997

§ 102(e) Date: Jun. 30, 1997

[87] PCT Pub. No.: WO97/16495

PCT Pub. Date: May 9, 1997

[30] Foreign Application Priority Data

Oct. 30, 1995 [JP] Japan ................................. 7-282204
Oct. 8, 1996 [JP] Japan ................................. 8-266860

[51] Int. Cl.⁶ ............................ C08L 67/00; C09D 11/00
[52] U.S. Cl. .......................... 523/161; 523/215; 523/512; 523/513; 524/514; 524/601; 524/602; 106/31.58; 106/31.86
[58] Field of Search ............................. 523/161, 512, 523/513, 215; 524/601, 602, 514; 106/31.58, 31.86

[56] References Cited

U.S. PATENT DOCUMENTS

| | | |
|---|---|---|
| 4,692,188 | 9/1987 | Ober et al. ........................ 524/601 |
| 4,963,189 | 10/1990 | Hindagolla . |
| 5,242,489 | 9/1993 | Schwarz et al. .................. 106/31.86 |
| 5,446,082 | 8/1995 | Asai et al. ........................ 524/601 |
| 5,679,724 | 10/1997 | Sacripante et al. ............... 524/601 |

FOREIGN PATENT DOCUMENTS

| | | |
|---|---|---|
| 4-28776 | 1/1992 | Japan . |
| 4-189876 | 7/1992 | Japan . |
| 4-261478 | 9/1992 | Japan . |
| 4-359071 | 12/1992 | Japan . |
| 4-359072 | 12/1992 | Japan . |

*Primary Examiner*—Andrew E. C. Merriam
*Attorney, Agent, or Firm*—Oblon, Spivak, McClelland, Maier & Neustadt, P.C.

[57] ABSTRACT

The aqueous ink of the present invention comprises a suspension of a polymer, preferably a polyester or a polyester polyamide, having adsorbed a dye or a pigment, wherein the surface tension ($\gamma$) and the viscosity ($\eta$) of the ink at 20° C. and the average particle size (d) of the suspended particles satisfy the following inequality (1):

$$0.1 \leq \gamma \cdot \eta \cdot d \leq 11 \quad (1)$$

wherein the units of the parameters $\gamma$, $\eta$ and d are dyne/cm, cps, and $\mu$m, respectively.

8 Claims, No Drawings

AQUEOUS INK

TECHNICAL FIELD

The present invention relates to an aqueous ink which is prevented from blurring on paper and provides prints having improved waterfastness and improved fixation. More particularly, the present invention relates to an aqueous ink useful for ink jet recording.

BACKGROUND OF THE INVENTION

Aqueous inks are frequently used as printing or writing inks for the ease of manufacture and handling. For example, with the recent development and spread of computers, printers have also been spreading, and aqueous inks are made frequently use of in such printers.

The inks for an ink jet printer, one of typical printers, usually comprise a water-soluble dye capable of dissolving in water so as to avoid clogging of nozzles with the ink. Inks comprising a water-soluble dye hardly obstruct the nozzles but, in turn, the resulting printed image has poor waterfastness.

Therefore, the composition of inks is of importance to improve waterfastness of printed images.

In order to improve the waterfastness of the inks for ink jet recording, it has been proposed to use ink comprising a pigment (see Japanese Patent Laid-Open Nos. 4-28776, 4-189876, 4-359071, and 4-359072), a non-aqueous medium (see Japanese Patent Laid-Open No. 4-261478), or a dye having excellent waterfastness (see U.S. Pat. No. 4,963,189).

However, use of a pigment in inks tends to incur a reduction in chroma of printed images and to cause clogging of the nozzles. Further, a pigment has insufficient fixation properties onto paper or an OHP (overhead projector) sheet, so that the printed image has insufficient record preservability. Neither has the other proposals succeeded in providing inks fully satisfying all the requirements, such as anti-blurring properties, waterfastness, and fixation.

Accordingly, an object of the present invention is to provide an aqueous ink which is prevented from blurring and provides printed images exhibiting improved waterfastness and improved fixation.

Another object of the present invention is to provide an aqueous ink which is particularly useful as an ink for ink jet recording.

DISCLOSURE OF THE INVENTION

In order to accomplish the above objects, the inventors of the present invention have extensively studied and found, as a result, that an aqueous ink containing a dye or a pigment is prevented from blurring and exhibits improved waterfastness and improved fixation without impairing the inherent color forming properties of the dye or pigment when the product (A) of a surface tension, a viscosity, and an average particle size of suspended particles (hereinafter sometimes simply referred to as "product (A)") is adjusted within a specific range.

For more preferably accomplishing the above objects, the inventors have found that the aqueous ink which is prevented from blurring and exhibits improved waterfastness and improved fixation without impairing the inherent color forming properties of the dye or pigment can be obtained by using a suspension in which a dye or a pigment is adsorbed onto micelles of a polyester or a polyester polyamide as a recording material and by adjusting the product (A) of a surface tension, a viscosity, and an average particle size of suspended particles within a specific range.

The present invention has been completed based on these findings. The present invention provides an aqueous ink comprising a suspension of a polymer, preferably a polyester or a polyester polyamide, having adsorbed a dye or a pigment as a recording material, wherein the surface tension ($\gamma$) and the viscosity ($\eta$) of the ink at 20° C. and the average particle size (d) of the suspended particles satisfy the following inequality (1):

$$0.1 \leq \gamma \cdot \eta \cdot d \leq 11 \tag{1}$$

wherein the units of the parameters $\gamma$, $\eta$ and d are dyne/cm, cps, and $\mu$m, respectively.

The polymer in the aqueous ink provided by the present invention preferably has an acid value of 3 to 100 KOHmg/g as measured according to JIS K 0070 and a glass transition point of not lower than 20° C. and contains, in its polymer chain, a unit derived from a diol component represented by formula (2) hereinafter shown (hereinafter described in detail).

The present invention also provides an aqueous ink for ink jet recording characterized by using the above-mentioned aqueous ink.

PREFERRED EMBODIMENTS OF THE INVENTION

The aqueous ink according to the present invention is characterized in that the ink comprises a suspension of a polymer, preferably a polyester or a polyester polyamide, having adsorbed a dye or pigment as a recording material and that the product (A) of the surface tension ($\gamma$) and the viscosity ($\eta$) of the ink at 20° C. and the average particle size (d) of the suspended particles is adjusted within a specific range, i.e., the surface tension ($\gamma$) and the viscosity ($\eta$) of the ink at 20° C. and the average particle size (d) of the suspended particles satisfy the above inequality (1). That is, at least part of the dye or pigment is adsorbed on or encapsulated in the micelles formed of a polymer, preferably a polyester or a polyester polyamide. Therefore, the term "adsorbed" as used herein is intended to include the state in which the dye or pigment is adsorbed onto the micelles formed of the polymer and the state in which the dye or pigment is encapsulated into the micelles. The aqueous ink of the present invention comprises an aqueous suspension of the polymer, preferably a polyester or a polyester polyamide, having adsorbed the dye or pigment and has such physical properties, as a whole, that the product (A) falls within a specific range.

The specific range for the product (A) of the aqueous ink of the present invention is from 0.1 to 11, preferably 0.1 to 10, still preferably 0.1 to 8, still preferably 0.3 to 6, still preferably 0.5 to 5, still preferably 0.5 to 4, and particularly preferably 0.5 to 3. When the product (A) is less than 0.1, the ink unfavorably reduces printing quality due to blur. When it exceeds 11, jetting (expelling) of the ink unfavorably becomes inadequate, resulting in reduction in printing quality.

In order to make the product (A) of the aqueous ink to fall within the above specific range, it is preferable that the surface tension (at 20° C.) of the ink be within a range of from 25 to 50 dyne/cm. If the surface tension is less than 25 dyne/cm, blur and reduction in printing quality may occur, and the ink may leak from the printer head nozzles of an ink jet printer. If it exceeds 50 dyne/cm, the drying rate of ink is too low, causing mixing of the ink, contamination at the printer head, or insufficient ink supply to the printer head nozzles, which may result in inadequacy of ink jetting and reduction of printing quality. The surface tension of the ink is preferably 28 to 43 dyne/cm. For an ink having a magenta, cyan or yellow tone, the surface tension is preferably 28 to 40 dyne/cm, still preferably 28 to 36 dyne/cm, particularly preferably 28 to 33 dyne/cm. For an ink having a black tone, it is preferably 28 to 40 dyne/cm.

The surface tension of the aqueous ink can be adjusted within the above range by, for example, controlling the concentration of the dye or pigment, controlling the concentration or molecular weight of the polymer (e.g., a polyester or a polyester polyamide), adding an additive, such as a surface tension regulator (e.g., various surface active agents), or selecting such a wetting agent that makes the surface tension of the ink 25 to 50 dyne/cm. The method of surface tension measurement will be described in detail in Examples hereinafter given.

In order for the product (A) to fall within the above specific range, the ink preferably has a viscosity of 0.5 to 8 cps, particularly 1 to 5 cps, especially 1 to 3 cps, at 20° C. If the viscosity is less than 0.5 cps, the ink may blur remarkably or leak from the printer head nozzles of an ink jet printer.

If it exceeds 8 cps, the ink has too high a viscosity for use in an ink jet printer, failing to be supplied to the printer head, causing inadequacy of jetting, which may result in scratches or reduction in printing quality. The above range is preferred accordingly. The viscosity of the aqueous ink can be adjusted within the above range by, for example, controlling the concentration of the dye or pigment, controlling the concentration or molecular weight of the polymer (e.g., a polyester or a polyester polyamide), adding additives, such as various surface active agents and surface tension regulators, or using a wetting agent selected so as to make the viscosity 0.5 to 8 cps in a controlled amount. The method of viscosity measurement will be described in detail in Examples hereinafter given.

In order to make the product (A) of the aqueous ink fall within the above specific range, it is preferable that the suspension of the polymer, e.g., a polyester or a polyester polyamide, having adsorbed the dye or pigment as a recording material has an average particle size of 0.005 to 0.5 µm. If the average particle size is less than 0.005 µm, the ink may blur. If it exceeds 0.5 µm, the suspension itself tends to have reduced dispersion stability. The above range is preferred accordingly. The above average particle size is preferably 0.005 to 0.3 µm, still preferably 0.005 to 0.2 µm, particularly preferably 0.01 to 0.1 µm, from the viewpoint of obtaining satisfactory results in terms of suspension forming properties and suspension stability. The average particle size can be so adjusted by, for example, altering the conditions of phase inversion emulsification hereinafter described.

The above-described suspension particularly preferably has the following particle size distribution.

Particle Size Distribution:

Particles having a particle size (d) of 0.1 µm or smaller= 60 to 100%; and

Particles having a particle size (d) of 0.5 µm or greater=0 to 10%

The polymer which can be used in the aqueous ink of the present invention is preferably one having an acid value of 3 to 100 KOHmg/g as measured according to JIS K 0070. A polymer having an acid value of less than 3 KOHmg/g may fail to provide a suspension having stably adsorbed thereon the dye or pigment. If the acid value exceeds 100 KOHmg/g, the ink may have poor waterfastness and poor fixation properties. Therefore, the above range is preferred. The acid value is still preferably 3 to 70 KOHmg/g, still preferably 10 to 60 KOHmg/g, still preferably 15 to 45 KOHmg/g, particularly preferably 15 to 40 KOHmg/g, especially preferably 18 to 37 KOHmg/g, for securing satisfactory results in improving suspension forming properties and stability.

Further, it is preferable for the polymer to have a glass transition point (Tg), as measured with a differential scanning calorimeter (DSC), of not lower than 20° C. for use in an ink jet system using a piezoelectric element or not lower than 30° C. for use in an ink jet system using heat energy. Whether the system uses piezoelectricity or heat energy, the Tg is still preferably 40° to 150° C., particularly preferably 50° to 150° C. If the Tg is below the above lower limit, when the aqueous ink is used in, e.g., an ink jet printer, the polymer may solidify in the nozzles of the printer, causing clogging; or when printed sheets of paper are laid on top of another, the ink may be transferred to the reverse side of the upper sheet.

The polymer to be used in the aqueous ink is not particularly limited. Examples of useful polymers include a polyester, a polyester polyamide, poly(meth)acrylic acid and derivatives thereof, and styrene-(meth)acrylic monomer copolymers, with a polyester and a polyester polyamide being preferred.

The polymer to be used in the aqueous ink preferably contains in the polymer chain thereof a unit derived from a diol component represented by formula (2) shown below.

The polyester and the polyester polyamide which can be preferably used in the aqueous ink will be explained.

The polyester and the polyester polyamide are preferably those capable of forming micelles capable of adsorbing a dye or pigment thereon. Those capable of forming micelles capable of encapsulating a dye or pigment therein are also useful with no particular limitation within a range that does not ruin the effects of the present invention.

While not limiting, the polyester is preferably the one obtained by co-polycondensing a diol component represented by formula (2) shown below (hereinafter referred to as a component (a)) and at least one acid component selected from the group consisting of a polycarboxylic acid having two or more carboxyl groups, an acid anhydride thereof, and a lower alkyl ester thereof (hereinafter referred to as a component (b)) (the polyester will hereinafter be referred to as a polyester (A)).

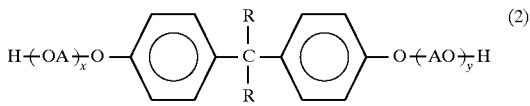

wherein R represents a lower alkyl group having 1 to 4 carbon atoms; A represents an alkylene group having 2 to 4 carbon atoms, e.g., an ethylene group or a propylene group; and x and y, which may be the same or different, each represent an integer of 1 or greater, the sum of x and y averaging 2 to 7.

The diol component represented by formula (2) as a component (a) will be described. While not limiting, this diol component is an alkylene oxide adduct of bisphenol A, preferably an ethylene oxide or propylene oxide adduct of bisphenol A. Specifically, polyoxypropylene (2.2)-2,2-bis (4-hydroxyphenyl) propane, polyoxypropylene (3.3)-2,2-bis (4-hydroxyphenyl) propane, polyoxyethylene (2.0)-2,2-bis (4-hydroxyphenyl) propane, polyoxypropylene (2.0)-polyoxyethylene (2.0)-2,2-bis (4-hydroxyphenyl) propane, and polyoxypropylene (6)-2,2-bis (4-hydroxyphenyl) propane can be used for preference.

The acid component as a component (b) is then described. The acid component is not particularly limited. For example, at least one member selected from the group consisting of a polycarboxylic acid having two or more carboxyl groups, an acid anhydride thereof, and a lower alkyl ester thereof can be used as stated above.

The polycarboxylic acid having two or more carboxyl groups includes a dicarboxylic acid and a polycarboxylic acid having three or more carboxyl groups.

While not limiting, the dicarboxylic acid preferably includes maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, a dimeric acid, and isooctylsuccinic acid.

While not limiting, the polycarboxylic having three or more carboxyl groups preferably includes 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, trimellitic anhydride, and a trimer of embole acid.

The lower alkyl esters of these polycarboxylic acids having two or more carboxyl groups preferably include esters with an alkyl group having 1 to 4 carbon atoms.

Of the above-enumerated polycarboxylic acids, a dicarboxylic acid, e.g., maleic acid, fumaric acid, itaconic acid, phthalic acid, isophthalic acid, terephthalic acid, succinic acid or a dimeric acid; 1,2,4-benzenetricarboxylic acid; or trimellitic anhydride is preferably used.

Also preferred is a polyester obtained by co-polycondensing a diol component represented by formula (2), i.e., the component (a), a dimeric acid (hereinafter referred to as a component (b')), and at least one component selected from the group consisting of a polycarboxylic acid having two or more carboxyl groups other than a dimeric acid, an acid anhydride thereof, and a lower alkyl ester thereof (hereinafter referred to as a component (b")) (the polyester will hereinafter be referred to as a polyester (B)).

The component (a) used in the polyester (B) is the same as used in polyester (A).

The dimeric acid as a component (b') will be explained. The term "dimeric acid" as used herein denotes a substance synthesized by polymerization reaction of two molecules of an unsaturated fatty acid. Such a dimeric acid includes an acyclic dimeric acid represented by formula (I) or (II) shown below, a monocyclic dimeric acid represented by formula (III), (IV) or (V) shown below, and a bicyclic dimeric acid represented by formula (VI) or (VII) shown below. Use of these dimeric acids as a polycondensing comonomer in the above polyester brings about improvements in suspension forming properties and suspension stability and an increase in amount of the encapsulated dye or pigment. These dimeric acids may be used either individually or as a combination of two or more thereof.

Commercially available dimeric acids can also be used. Commercially available dimeric acids comprise a multi-component mixture of the acyclic dimeric acids represented by formulae (I) and (II), the monocyclic dimeric acids represented by formulae (III), (IV) and (V), and the bicyclic dimeric acids represented by formulae (VI) and (VII) and include, for example, Unidime 22 (a trade name; rich in acyclic dimeric acids; a product of Union Cap) and Haridimer 250K (a trade name; rich in bicyclic dimeric acids; a product of Harima Chemicals, Inc.).

Acyclic Dimeric Acid

(I)

(II)

wherein $R_1$ and $R_2$, which may be the same or different, each represent an alkyl group; and $R_3$ and $R_4$, which may be the same or different, each represent an alkyl group; the total number of the carbon atoms in $R_1$, $R_2$, $R_3$ and $R_4$ being 31.

Monocyclic Dimeric Acid

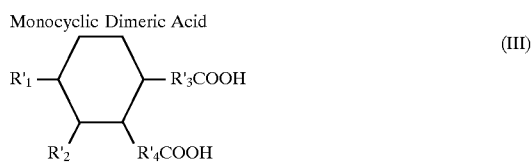

(III)

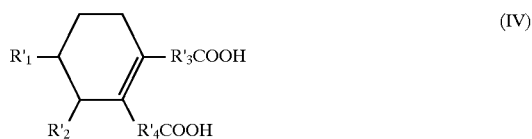

(IV)

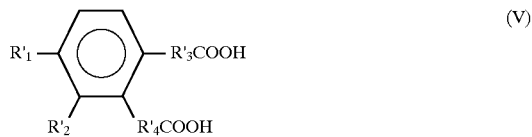

(V)

wherein $R'_1$ and $R'_2$, which may be the same or different, each represent an alkyl group; $R'_3$ and $R'_4$, which may be the same or different, each represent an alkyl group; the total number of the carbon atoms in $R'_1$, $R'_2$, $R'_3$, and $R'_4$ being 30.

Bicyclic Dimeric Acid

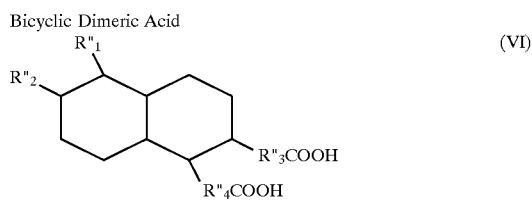

(VI)

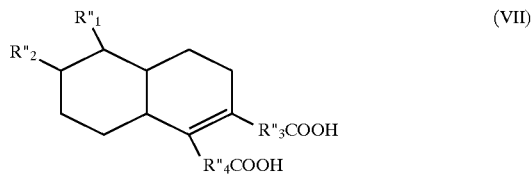

(VII)

wherein $R''_1$ and $R''_2$, which may be the same or different, each represent an alkyl group; and $R''_3$ and $R''_4$, which may be the same or different, each represent an alkyl group; the total number of the carbon atoms in $R''_1$, $R''_2$, $R''_3$ and $R''_4$ being 24.

Among the above-described dimeric acids, the acyclic dimeric acids are preferably used for the improvements in suspension forming properties and suspension stability. The dimeric acids represented by formula (I) are particularly preferred.

The component (b") used in the polyester (B) can be selected from the compounds enumerated as a component (b) to be used in the polyester (A) except a dimeric acid.

The molar ratio of the component (a), the component (b') and the component (b") used in the polyester (B) is selected arbitrarily as long as the resulting polyester has a Tg of not lower than 20° C., while depending on the acid value, the number average molecular weight, and the Tg of the polyester (B). A preferred molar ratio of the component (b') to the component (a) is 0.05 to 0.7, particularly 0.1 to 0.5; and a preferred molar ratio of the component (b") to the component (a) is 0.6 to 1.2, particularly 0.8 to 1.1.

While not limiting, the polyester polyamide is preferably the one obtained by co-polycondensing a diol component represented by formula (2) (i.e., the component (a)), at least one acid component selected from the group consisting of a polycarboxylic acid having two or more carboxyl groups, an acid anhydride thereof, and a lower alkyl ester thereof (i.e., the component (b)), and an amine derivative (hereinafter referred to as a component (c)).

The component (a) used in the polyester polyamide is not particularly limited. For example, the same component (a) as used in the polyester (A) and the polyester (B) can be used. The component (b) used in the polyester polyamide can be the same as the component (b) used in the polyester (A).

The amine derivative as a component (c) used in the polyester polyamide is not particularly limited as long as it is capable of co-polycondensation with the components (a) and (b). Such an amine includes polyamines, such as ethylenediamine, pentamethylenediamine, hexamethylenediamine, diethylenetriamine, iminobispropylamine, phenylenediamine, xylylenediamine, and triethylenetetramine; aminocarboxylic acids, such as 6-aminocaproic acid and $\epsilon$-caprolactam; and amino alcohols, such as propanolamine.

While depending on the acid value, the number average molecular weight, and the Tg of the polyester polyamide, a preferred molar ratio of the component (b) to the component (a) is 0.6 to 1.2, particularly 0.8 to 1.1, and a preferred molar ratio of the component (c) to the component (a) is 0.05 to 0.7, particularly 0.1 to 0.5.

The acid value, the Tg, the number average molecular weight, etc. of the polyester and the polyester polyamide can be controlled by, for example, changing the ratios of the polycondensation components in the co-polycondensation (i.e., the components (a), (b), (b'), (b"), and (c)), using a carboxylic acid ester, or blocking the acid with a monohydric alcohol.

The method of co-polycondensation is not particularly limited, and any known method can be employed.

The polyester and the polyester polyamide preferably have a number average molecular weight (on polystyrene conversion in gel-permeation chromatography) of 500 to 100000, still preferably 1000 to 50000, particularly 1500 to 30000, especially 2000 to 15000, from the standpoint of prevention of scorching and sticking to a printer head, waterfastness and fixation of the ink after printing, and suspension forming properties.

The aqueous ink of the present invention preferably contains the polyester or the polyester polyamide in a proportion of 1 to 50% by weight, particularly 2 to 30% by weight. If the proportion of the polyester or the polyester polyamide is less than 1% by weight, the ink tends to have an insufficient print density. If it exceeds 50% by weight, the storage stability of the suspension as an ink tend to be reduced and, particularly when the ink is used in an ink jet printer, the ink tends to obstruct the printer head due to an increase in viscosity accompanying evaporation from the tip of the nozzle or agglomeration of suspended particles. Therefore, the above range is preferred.

The dye and the pigment which are adsorbed onto the micelles of the polyester and the polyester polyamide will now be explained.

Any dye can be used with no particular limitation as long as is adsorbable by the polyester or the polyester polyamide. For example, oil soluble dyes, disperse dyes, direct dyes, acid dyes, and basic dyes can be used. From the viewpoint of satisfactory encapsulation, oil soluble dyes and disperse dyes are particularly preferred.

Specific but non-limiting examples of particularly preferred disperse dyes are C.I. Disperse Yellow 5, 42, 54, 64, 79, 82, 83, 93, 99, 100, 119, 122, 124, 126, 160, 184:1, 186, 198, 199, 201, 204, 224, and 237; C.I. Disperse Orange 13, 29, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C.I. Disperse Violet 31 and 33; C.I. Disperse Blue 36, 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1 and 9.

Specific but non-limiting examples of particularly preferred oil soluble dyes are C.I. Solvent Black 3, 7, 27, 29, and 34; C.I. Solvent Yellow 14, 16, 19, 21, 25, 29, 30, 56, 82, 93, and 162; C.I. Solvent Red 1, 3, 8, 18, 19, 24, 27, 43, 49, 51, 72, 73, 83, 109, 112, 117, 122, 132, 138, and 218; C.I. Solvent Violet 3; C.I. Solvent Blue 2, 11, 25, 35, 38, 63, 67, 70, 95, and 117; C.I. Solvent Green 3 and 7; and C.I. Solvent Orange 2.

Specific but non-limiting examples of particularly preferred direct dyes include C.I. Direct Black 19.

Specific but non-limiting examples of particularly preferred acid dyes are C.I. Acid Black 2 and 52; C.I. Acid Yellow 23; C.I. Acid Red 51, 87, and 92; and C.I. Acid Blue 1, 9, and 74.

Specific but non-limiting examples of particularly preferred basic dyes are C.I. Basic Yellow 2 and 11; C.I. Basic Red 1 and 13; C.I. Basic Violet 1, 3, 7, and 10; and C.I. Basic Blue 5, 7, 9, and 26.

Considering that the dye can be efficiently adsorbed on the polyester or the polyester polyamide through phase inversion emulsification hereinafter described, the dye preferably has a solubility of 20 g/l or more, particularly 100 to 600 g/l in solvent, for example, ketone.

As to the pigment used in the aqueous dye of the present invention, on the other hand, any pigment that can be adsorbed by the polyester or the polyester polyamide can be used with no particular limitation. Useful pigments include azo pigments, such as azo lakes, insoluble azo pigments, condensed azo pigments, and chelate azo pigments; polycyclic pigments, such as phthalocyanine pigments, perylene and perinone pigments, anthraquinone pigments, quinacridone pigments, dioxazine pigments, thioindigo pigments, isoindolinone pigments, and quinophthalone pigments; dye lakes, such as basic dye lakes and acid dye lakes; organic pigments, such as nitro pigments, nitroso pigments, aniline black, and daylight fluorescent pigments; and inorganic pigments, such as titanium oxide, iron oxides, and carbon black. Further, any pigment that is dispersible in an aqueous phase, although not described in Color Index, can be used. As a matter of course, the above-described pigments having been surface treated with a surface active agent, a polymeric dispersant, etc., as well as a grafted carbon can also be used.

Of the above-mentioned pigments, azo pigments, phthalocyanine pigments, anthraquinone pigments, and carbon black pigments are particularly preferred.

These dyes and pigments may be used either individually or as a combination of dyes and pigments. In the latter case, the mixing ratio of a dye and a pigment is selected arbitrarily from the range of from 10:90 to 90:10 by weight.

The terminology "pigment" as used herein denotes a finely particulate solid insoluble in water, a solvent or oil, while the terminology "dye" as used herein denotes a colorant capable of dyeing in a dissolved state in water or a solvent (see Society of Synthetic Organic Chemistry, Japan (ed.), *Color Chemical Jiten*, 1st Ed., p. 45 and the following, C.M.C. K.K. (March, 1988)).

The dye or pigment is preferably present in the aqueous ink of the present invention in a proportion of 1 to 30% by weight, particularly 1.5 to 25% by weight. If the proportion of the dye or pigment is less than 1% by weight, the print density is insufficient. If it exceeds 30% by weight, an appreciable improvement in print density cannot be expected, and the stability of the suspended particle size is reduced with time, showing a tendency that the average particle size increases. Therefore, the above-described range is preferred.

The aqueous ink of the present invention comprises a suspension of the polyester or polyester polyamide having adsorbed thereon the dye or pigment in water as a medium. If desired, the aqueous ink may additionally contain conventionally known various additives, such as wetting agents (e.g., polyhydric alcohols), dispersants, defoaming agents (e.g., silicone), surface tension regulators (such as various cationic, anionic or nonionic surface active agents), antifungal agents (e.g., chloromethylphenol derivatives) and/or chelating agents (e.g., EDTA), and oxygen absorbing agents (e.g., sulfites).

In preparing the aqueous ink of the present invention, it is preferable to remove coarse particles. To this effect, the ink prepared by mixing is subjected to, for example, filtration under pressure or centrifugation to remove coarse particles, preferably particles greater than 2 $\mu$m, still preferably particles greater than 1 $\mu$m, particularly preferably particles greater than 0.5 $\mu$m to thereby obtain an ink causing no clogging.

The wetting agents are not particularly limited. Example of useful wetting agents include glycols, such as ethylene glycol, propylene glycol, diethylene glycol, triethylene glycol, tetraethylene glycol, and polyethylene glycol; glycerol; ethers and acetates derived from polyhydric alcohol, such as diethylene glycol diethyl ether, diethylene glycol monobutyl ether, ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, and propylene glycol monomethyl ether; thiodiglycol; nitrogen-containing compounds, such as N-methyl-2-pyrrolidone, 1,3-dimethylimidazolidinone, triethanolamine, formamide, and dimethylformamide; dimethyl sulfoxide; and mixtures of two or more thereof. While not particularly limiting, the amount of these wetting agents to be used is preferably 0.1 to 50% by weight, still preferably 0.1 to 30% by weight, based on the aqueous ink.

The dispersants are not particular limited. For example, anionic surface active agents selected from the group consisting of alkylsulfonates, alkylbenzenesulfonates, alkylnaphthalenesulfonates, alkane- or olefin-sulfonates, alkylsulfuric ester salts, polyoxyethylene alkyl- or alkylaryl ether sulfuric ester salts, alkyl phosphates, alkyl diphenyl ether disulfonates, ether carboxylates, alkylsulfosuccinates, α-sulfofatty acid esters, and fatty acid salts; condensates between higher fatty acids and amino acids; naphthenates, etc. can be used. Anionic surface active agents that are preferably used are those selected from the group consisting of alkylbenzenesulfonates (especially those containing a straight-chain alkyl group), alkane- or olefinsulfonates (especially secondary alkanesulfonates and α-olefinsulfonates), alkylsulfuric ester salts, polyoxyethylene alkyl- or alkylaryl ether sulfuric ester salts (especially polyoxyethylene alkyl ether sulfuric ester salts), alkyl phosphates (especially monoalkyl phosphates), ether carboxylates, alkylsulfosuccinates, α-sulfofatty acid esters, and fatty acid esters. Particularly preferred are alkylsulfonates, alkylbenzenesulfonates (especially those having a straight-chain alkyl group), polyoxyethylene alkyl- or alkylaryl ether sulfuric ester salts (especially polyoxyethylene alkyl ether sulfuric ester salts), and alkylsulfuric ester salts. These surface active agents can be used either individually or as a combination of two or more thereof.

Useful cationic surface active agents include aliphatic amines, quaternary ammonium salts, sulfonium salts, and phosphonium salts. They can be used either individually or as a combination of two or more thereof.

Useful nonionic surface active agents are selected from the group consisting of polyoxyethylene alkyl ethers, polyoxyethylene alkylaryl ethers, sorbitan fatty acid esters, polyoxyethylene sorbitan fatty acid esters, polyoxyethylene sorbitol fatty acid esters, glycerol fatty acid esters, polyoxyethylene fatty acid esters, and alkyl(poly) glycosides. Preferred of them are those selected from polyoxyethylene alkyl ethers and polyoxyethylene alkylaryl ethers. They can be used either individually or as a combination of two or more thereof.

Useful ampholytic surface active agents include amino acid type surface active agents and betaine type surface active agents.

Useful polymeric dispersants include proteins, such as gelatin and casein; natural rubber, such as gum arabic; glycosides, such as saponin; cellulose derivatives, such as alkyl cellulose, carboxyalkyl cellulose, and hydroxyalkyl cellulose; natural polymers, such as lignin sulfonates and shellac; and anionic polymers, such as polyacrylic acid salts, styrene-acrylic acid copolymer salts, vinylnaphthalene-acrylic acid copolymer salts, styrene-maleic acid copolymer salts, vinylnaphthalene-maleic acid copolymer salts, β-naphthalenesulfonic acid-formalin condensate salts, and polyphosphoric acid; and nonionic polymers, such as polyvinyl alcohol, polyvinyl pyrrolidone, and polyalkylene glycol. These polymeric dispersants can be used either individually or as a combination of two or more thereof.

In particular, a compound represented by formula (3) shown below is preferred for its effect in reducing the average particle size of the suspension.

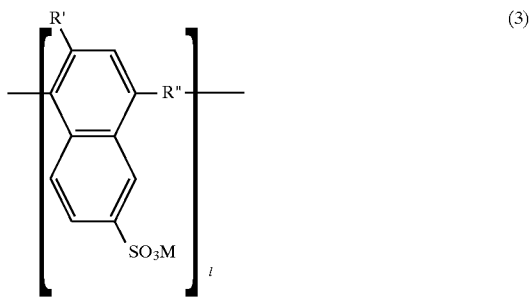

(3)

wherein R' represents a hydrogen atom, a hydrocarbon group having 1 to 10 carbon atoms or a hydroxyl group; R" represents a hydrocarbon group having 1 to 5 carbon atoms; M represents a monovalent cation; and l represents an integer of 1 to 1000.

In formula (3), R' represents a hydrogen atom, a hydrocarbon group having 1 to 10 carbon atoms or a hydroxyl group, preferably a hydrogen atom. R" represents a hydrocarbon group having 1 to 5 carbon atoms, preferably a methylene group. M represents a monovalent cation, preferably an alkali metal (e.g., sodium or potassium) ion. l represents an integer of from 1 to 1000, preferably 100 to 800. The compound represented by formula (3) preferably has an HLB (hydrophile-lipophile balance) value of 5 to 15 for manifestation of the effect as a dispersant and for the effect in suppressing an increase in average particle size of the suspension.

Commercially available products represented by formula (3) can also be used. Such commercially available products include DEMOL SNB, MS, N, SSL, ST, and P (trade names of the dispersants produced by Kao Corp.).

While not limiting, the dispersant is preferably used in an amount of 0.01 to 10% by weight in the aqueous ink. If the amount of the dispersant is less than 0.01% by weight, it is difficult to reduce the particle size of the suspension. If it exceeds 10% by weight, the average particle size of the suspended particles tends to increase, or the suspension stability tends to be reduced, which may result in gelation. Therefore, the above range is preferred. A still preferred amount of the dispersant in the aqueous ink is 0.1 to 1% by weight.

While the defoaming agents are not particularly limited, it is particularly preferred to use a compound represented by formula (4), especially a compound represented by formula (5), in order to suppress foaming during ink preparation and to adjust the surface tension of the ink.

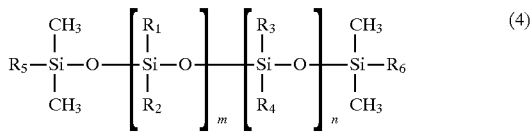

wherein $R_1$, $R_2$, $R_3$, and $R_4$, which may be the same or different, each represent an alkyl group having 1 to 10 carbon atoms or an aryl group; $R_5$ and $R_6$, which may be the same or different, each represent an alkyl group having 1 to 10 carbon atom, an aryl group, a hydroxyl group, an amino group, a carboxyl group or an epoxy group; and m and n, which may be the same or different, each represent an integer of 0 to 1000, preferably 1 to 1000.

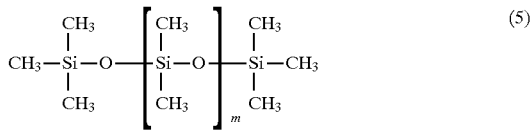

wherein m represents an integer of 0 to 1000, preferably 1 to 1000.

In formula (4), $R_1$, $R_2$, $R_3$, and $R_4$, which may be the same or different, each preferably present a lower alkyl group having 1 to 5 carbon atoms or a phenyl group; m and n each preferably represent an integer of 10 to 100; and $R_5$ and $R_6$, which may be the same or different, each preferably represent a lower alkyl group having 1 to 5 carbon atoms or a phenyl group.

Commercially available products represented by formula (4) or (5) can also be used. Such commercially available products include KF 96, 66 and 69, KS68, 604, 607A, 602, and 603, KM 73, 73A, 73E, 72, 72A, 72C, 72F, 82F, 70, 71, 75, 80, 83A, 85, 89, 90, 68-1F, and 68-2F (trade names of Shin-Etsu Silicone).

The amount of the compound represented by formula (4) or (5) is not particularly limited, but the compound is preferably added to the aqueous ink in an amount of 0.001 to 2% by weight. If the amount is less than 0.001% by weight, the system tends to foam during ink preparation, and small bubbles in the ink are difficult to remove. If it exceeds 2% by weight, foaming could be suppressed, but small bubbles generated in the ink collapse upon printing, resulting in the reduction of printing quality. Therefore, the above range is preferred. A still preferred amount of the compound represented by formula (4) or (5) is 0.005 to 0.5% by weight based on the aqueous ink.

The surface tension regulators include the above-described silicone defoaming agents and cationic, anionic or nonionic surface active agents. It is particularly preferred to use the silicone defoaming agents represented by formula (4) or (5), ethylene oxide compounds of alkylphenols represented by formula (6) shown below, or ethylene oxide adducts of acetylene glycol represented by formula (7) shown below from the viewpoint of suppression of foaming, ease of control of the surface tension, ink jetting properties, anti-blurring properties, and freedom from unevenness in print density.

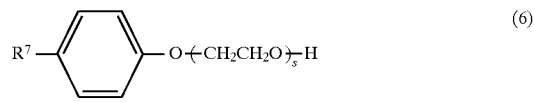

wherein $R^7$ represents an alkyl group; and s represents an integer of 1 or greater.

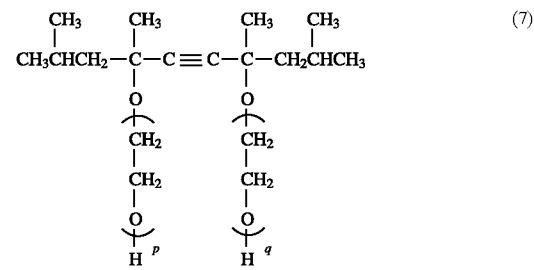

wherein p and q, which may be the same or different, each represent an integer of 1 or greater.

These surface tension regulators can be used either individually or as a combination of two or more thereof. They are desirably used in an amount of 0.005 to 15% by weight based on the aqueous ink. If the amount is less than 0.005%, the above characteristics may not be manifested. If it exceeds 15% by weight, the printing quality tends to be reduced due to brurring or unevenness in print density, or the ink tends to have reduced liquid stability. Therefore, the above range is preferred.

The aqueous ink of the present invention is useful particularly as an aqueous ink for ink jet recording. In this use, while the aqueous ink can be applied to an inkjet printer either of piezoelectric system or thermal jet system, the ink shows excellent effects of bringing further improvement in fixation particularly when applied to an ink jet printer of thermal jet system as is demonstrated in Examples hereinafter described. In particular, the aqueous ink shows an outstanding effect when used in ink jet recording by a thermal jet system using an electrical resistance heater as a heat energy source.

A preferred process for preparing the aqueous ink according to the present invention will be illustrated taking the case of using the polyester (A) for instance.

The aqueous ink of the present invention is preferably prepared by so-called phase inversion emulsification.

The phase inversion emulsification comprises adding the polyester (A) obtainable by co-polycondensation of a diol component represented by formula (2) (i.e., the component (a)) and at least one acid component selected from the group consisting of a polycarboxylic acid having two or more carboxyl groups, an acid anhydride thereof, and a lower alkyl ester thereof (i.e., the component (b)) (the polyester (A) preferably has an acid value of 3 to 100 KOHmg/g) to a solvent together with a dye or a pigment, adding a neutralizing agent to ionize the carboxyl groups of the polyester (A), adding water to the system, and evaporating the solvent to induce phase inversion into an aqueous system.

First of all, the polyester (A) is added to a solvent together with a dye or a pigment. In this case, it is preferable for suspension formation that the polyester (A) be added in an amount of 5 to 50 parts by weight per 100 parts by weight of the solvent.

While not particularly limiting, the solvent includes ketone solvents, such as acetone, methyl ethyl ketone, diethyl ketone, dipropyl ketone, methyl isobutyl ketone, and methyl isopropyl ketone, with methyl ethyl ketone being preferred.

Then, a neutralizing agent is added to the mixture of the polyester (A), the dye or pigment, and the solvent whereby the carboxyl groups in the polyester (A) are ionized. Any neutralizing agent can be used with no particular limitation as long as it is capable of ionizing the carboxyl groups of the polyester (A). Such a neutralizing agent includes aqueous ammonia; an aqueous solution of a monovalent inorganic salt, e.g., lithium hydroxide, sodium hydroxide, and potassium hydroxide; and amines, e.g., allylamine, isopropylamine, diisopropylamine, ethylamine, diethylamine, triethylamine, 2-ethylhexylamine, 3-ethoxypropylamine, diisobutylamine, 3-diethylaminopropylamine, tri-n-octylamine, t-butylamine, sec-butylamine, propylamine, methylaminopropylamine, dimethylaminopropylamine, n-propanolamine, butanolamine, 2-amino-4-pentanol, 2-amino-3-hexanol, 5-amino-4-octanol, 3-amino-3-methyl-2-butanol, monoethanolamine, diethnaolamine, dimethylethanolamine, triethanolamine, isopropanolamine, neopentanolamine, diglycolamine, ethylenediamine, 1,3-diaminopropane, 1,2-diaminopropane, 1,6-diaminohexane, 1,9-diaminononane, 1,12-diaminododecane, a dimeric fatty acid diamine, 2,2,4-trimethyl-hexamethylenediamine, 2,4,4-trimethylhexamethylenediamine, hexamethylenediamine, N-aminoethylpiperazine, N-aminopropylpiperazine, N-aminopropyldipiperidipropane, and piperazine. In particular it is preferable to use sodium hydroxide, potassium hydroxide, triethylamine or dimethylethanolamine as a neutralizing agent. In this case, the resulting suspension has a finer particle size and improved stability. Use of sodium hydroxide or potassium hydroxide as a neutralizing agent is especially preferred; for the resulting suspension exhibits improved heat resistance as well. The neutralizing agent is used in an amount enough to ionize the carboxyl groups in the polyester (A) at the least.

A particularly preferred amount of the neutralizing agent to be added is selected from the range of from 0.8×F(g) to 1.5×F(g), wherein F(g) is a value calculated from equation (i):

$$F(g) = (\text{acid value of polymer}) \times (\text{molecular weight of neutralizing agent}) \times (\text{weight }(g)\text{ of polymer})/56100 \quad (i)$$

After the addition of the neutralizing agent, water is added to the mixture to induce phase inversion, whereby a suspension of the polyester (A) in an aqueous phase is obtained. The amount of water to be added preferably ranges 100 to 300 parts by weight per 100 parts by weight of the mixture. It is preferable to add to the mixture a mixture formed by adding a compound represented by formula (3) to water. In this case, the resulting suspension has a finer average particle size. It is also preferable to add to the mixture a mixture formed by adding a compound represented by formula (4) or (5) to water. In this case, foaming can be suppressed, and the surface tension can be adjusted thereby. The compound represented by formula (3) is preferably used in such an amount that gives a final concentration of 0.01 to 10% by weight in the finally obtained ink. The compound represented by formula (4) or (5) is preferably used in such an amount that gives a final concentration of 0.001 to 2% by weight in the finally obtained ink.

After completion of the phase inversion, heat is applied under reduced pressure to remove the solvent and a prescribed amount of water from the mixture to thereby obtain a suspension of the polyester (A) having a desired concentration, in which the dye or pigment is adsorbed on the polyester (A).

While a preferred process for preparing the aqueous ink of the present invention has been described with particular reference to the case of using the polyester (A), an aqueous ink comprising a suspension of the polyester (B) or the polyester polyamide having adsorbed thereon a dye or a pigment can be prepared in the same manner, except for replacing the polyester (A) with the polyester (B) or the polyester polyamide.

The pH of the suspension and the finally obtained aqueous ink is preferably adjusted within a range of from 5 to 12 in order to secure suspension stability.

While the aqueous ink according to the present invention is particularly suitable for use in ink jet recording as described hereinabove, it is also usable in general writing pens, e.g., fountain pens, ball-point pens, marker pens, etc.

The effectiveness of the aqueous ink of the present invention will now be demonstrated with reference to Examples, but the present invention should not be construed as being limited thereto.

EXAMPLE 1

In a 2 l four-necked flask made of glass were put 1050 g of polyoxypropylene(2,2)-2,2-bis(4-hydroxyphenyl) propane, 350 g of maleic acid, and 1.5 g of hydroquinone. A thermometer, a stirring rod made of stainless steel, a down flow type condenser, and a pipe for introducing nitrogen were fitted to the flask. The mixture was allowed to react while stirring in a nitrogen stream at 210° C. with a mantle heater. The degree of polymerization was followed by measuring the softening point according to ASTM E28-67 as an index, and the reaction was ceased when the softening point reached 93° C. The resulting polyester (polyester (A)) was a pale yellow solid whose Tg was 56.5° C. as measured with DSC. The polyester had an acid value of 31.2 KOHmg/g as measured in accordance with JIS K 0070 and a number average molecular weight (value measured as polystyrene using in gel-permeation chromatography) of 3,100.

In a separable flask were put 150 g of the polyester, 45 g of an oil soluble dye (OIL BLACK 860, produced by Orient Chemical Industries Ltd.), and 500 g of methyl ethyl ketone. After purging the flask with $N_2$, the mixture was stirred to completely dissolve the polyester and the oil soluble dye in methyl ethyl ketone. Subsequently, 8.18 g of dimethylethanolamine was added thereto to ionize the carboxyl groups in the polyester. To the mixture was further added dropwise 960 g of deionized water containing 3 g of DEMOL N (a dispersant produced by Kao Corp.; HLB value: 8.51), followed by stirring. The mixture was heated to 40° C. under reduced pressure to remove methyl ethyl ketone to obtain an aqueous ink comprising 20% by weight of a suspension of the polyester having the dye adsorbed (average particle size: 0.02 μm).

EXAMPLE 2

A polyester (polyester A; acid value: 33.0 KOHmg/g; Tg: 54.8° C.; number average molecular weight: 3400) was obtained in the same manner as in Example 1, except for replacing maleic acid as used in Example 1 with a 2:1 mixture of itaconic acid and trimellitic anhydride.

In the same manner as in Example 1, except for using the above obtained polyester and replacing dimethylethanolamine as a neutralizing amine with 12.50 g of triethylamine, an aqueous ink comprising 20% by weight of a suspension of the polyester having a dye (OIL SCARLET 308, produced by Orient Chemical Industries Ltd.) adsorbed thereon (average particle size: 0.07 μm) was obtained.

EXAMPLE 3

In the same manner as in Example 1, except that 960 g of the deionized water containing 3 g of DEMOL N (dispersant produced by Kao Corp.; HLB value: 8.51) as used in Example 1 further contained 0.15 g of KM-71 (a defoaming agent produced by Shin-Etsu Chemical Co., Ltd.), an aqueous ink comprising 15% by weight of a suspension of the polyester having 45 g of a dye (OIL PINK 312, produced by Orient Chemical Industries Ltd.) adsorbed (average particle size: 0.03 μm) was obtained.

EXAMPLE 4

In a 2 l four-necked flask made of glass were put 1050 g of polyoxypropylene(2,2)-2,2-bis(4-hydroxyphenyl) propane, 168 g of a dimeric acid (Unidime 22, produced by Union Cap), 250 g of fumaric acid, 115 g of trimellitic anhydride, and 1.5 g of hydroquinone. A thermometer, a stirring rod made of stainless steel, a down flow type condenser, and a pipe for introducing nitrogen were fitted to the flask. The mixture was allowed to react while stirring in a nitrogen stream at 210° C. with a mantle heater. The degree of polymerization was followed by measuring the softening point as measured according to ASTM E28-67 as an index, and the reaction was ceased when the softening point reached 105° C. The resulting polyester (polyester (B)) was a pale yellow solid whose Tg was 52.0° C. as measured with DSC. The polyester had an acid value of 37.1 KOHmg/g as measured in accordance with JIS K 0070 and a number average molecular weight (value measured as polystyrene using gel-permeation chromatography) of 3,000.

In a separable flask were put 150 g of the polyester, 40 g of an oil soluble dye (OIL YELLOW 129, produced by Orient Chemical Industries Ltd.), and 500 g of methyl ethyl ketone. After purging the flask with $N_2$, the mixture was stirred to completely dissolve the polyester and the oil soluble dye in methyl ethyl ketone. Subsequently, 4.37 g of sodium hydroxide was added thereto to ionize the carboxyl groups in the polyester. To the mixture was further added dropwise 960 g of deionized water, followed by stirring. The mixture was heated to 40° C. under reduced pressure to remove methyl ethyl ketone to obtain an aqueous ink comprising 20% by weight of a suspension of the polyester having the dye adsorbed (average particle size: 0.04 μm).

EXAMPLE 5

An aqueous ink comprising 20% by weight of a suspension of a polyester having 40 g of a dye (Neopem Yellow 075 produced by BASF) adsorbed (average particle size: 0.01 μm) was obtained in the same manner as in Example 4, except for replacing 960 g of deionized water as used in Example 4 with 960 g of deionized water containing 3 g of DEMOL N (a dispersant produced by Kao Corp.; HLB value: 8.51).

EXAMPLE 6

In a 2 l four-necked flask made of glass were put 1050 g of polyoxypropylene(2,2)-2,2-bis(4-hydroxyphenyl) propane, 250 g of fumaric acid, 115 g of trimellitic anhydride, 40 g of 6-aminocaproic acid, and 1.5 g of hydroquinone. A thermometer, a stirring rod made of stainless steel, a down flow type condenser, and a pipe for introducing nitrogen were fitted to the flask. The mixture was allowed to react while stirring in a nitrogen stream at 220° C. with a mantle heater. The degree of polymerization was followed by measuring the softening point according to ASTM E28-67 as an index, and the reaction was ceased when the softening point reached 108° C. The resulting polyester polyamide was a pale yellow solid whose Tg was 55.6° C. as measured with DSC. The polyester had an acid value of 38.5 KOHmg/g as measured in accordance with JIS K 0070 and a number average molecular weight (value measured as polystyrene using gel-permeation chromatography) of 3200.

In a separable flask were put 150 g of the polyester polyamide, 40 g of an oil soluble dye (VALIFAST BLUE 2606, produced by Orient Chemical Industries Ltd.), and 500 g of methyl ethyl ketone. After purging the flask with $N_2$, the mixture was stirred to completely dissolve the polyester polyamide and the oil soluble dye in methyl ethyl ketone. Subsequently, 14.58 g of triethylamine was added thereto to ionize the carboxyl groups in the polyester. To the mixture was further added dropwise 960 g of deionized water, followed by stirring. The mixture was heated to 40° C. under reduced pressure to remove methyl ethyl ketone to obtain an aqueous ink comprising 20% by weight of a suspension of the polyester polyamide having the dye adsorbed (average particle size: 0.06 μm).

EXAMPLE 7

An aqueous ink comprising 20% by weight of a suspension of a polyester polyamide having a dye (Carbon Black MA-100, produced by Mitubishi Chemical Corporation, Ltd.) adsorbed (average particle size: 0.05 μm) was obtained in the same manner as in Example 6, except for replacing 960 g of deionized water as used in Example 6 with 960 g of deionized water containing 3 g of DEMOL N (a dispersant produced by Kao Corp.; HLB value: 8.51).

EXAMPLE 8

After the following components were formulated to prepare an ink,

| | |
|---|---|
| Carbon black (MA-100, produced by Mitsubishi Chemical Corporation, Ltd.) | 200 g |
| Styrene-maleic anhydride copolymer (acid value: 130; molecular weight: 10000) | 30 g |
| Ethanolamine | 40 g |
| Diethylene glycol | 200 g |
| Glycerol | 50 g |
| Deionized exchanged water | 420 g |
| Polyoxyethylene nonyl phenyl ether (Emulgen 985, produced by Kao Corp.) | 30 g | the resulting mixture was dispersed by means of Dynomill under the following conditions:

Grinding medium: Titania beads

Size of grinding medium: φ 0.8 mm in diameter

Packing Degree of grinding medium: 80%

Output rate: 100 g/min

Number of passes: 8

The resulting dispersion was subjected to centrifugal separation (10000 rpm, 15 min.) to remove dust and coarse particles to obtain a mill base of an aqueous pigment ink.

EXAMPLE 9

| Aqueous ink comprising polyester suspension obtained in Example 1 | 85 g |
| --- | --- |
| Ethanolamine | 2 g |
| Diethylene glycol | 10 g |
| Glycerol | 2.5 g |
| Acetylenol EL | 0.5 g |

The above components were mixed, and the resulting dispersion was filtered through a 5 μm filter to remove dust and coarse particles to obtain an ink for ink jet recording. The surface tension and viscosity at 20° C. and the average particle size of the resulting ink for ink jet recording were measured according to the methods described below, and the product (A) was calculated. The results obtained are shown in Table 1 below.

Printing was carried out using the resulting ink on a commercially available ink jet printer, Microbubble Jet Printer BJ-10VL (manufactured by Canon Inc.). The ink output, printing density, anti-blurring properties, degree of fixation, waterfastness, and anti-clogging properties were evaluated in accordance with the following methods. The results of evaluations are shown in Table 1.

Surface Tension

The surface tension of the ink was measured with an automatic surface tensiometer (Model CBVP-Z, manufactured by Kyowa Interface Science Co., Ltd.).

Viscosity

The viscosity of the ink was measured with an E-type viscometer (VISCONIC ELD, manufactured by TOKIMEK INC.) or a rotational vibration viscometer (Viscomate VM-100.

Average Particle Size & Particle Size Distribution

The average particle size and the particle size distribution of the ink were measured with a Coulter counter (Model N4SD). Further, the suspended particles were directly observed under an electron microscope (TEM or SEM) to measure the particle side to obtain an average particle size and a particle size distribution.

Ink Output

Pringing was carried out uniformly over the entire area of regenerated paper for PPC (manufactured by Nippon Kakoh Seishi Co., Ltd.) with the ink. The ink cartridge was weighed before and after the printing, and the ink output was calculated from the change in weight.

Printing density

Regenerated paper for PPC (manufactured by Nippon Kakoh Seishi Co., Ltd.) was printed solid with the ink and dried spontaneously for 24 hours in a room. The optical density of the print was measured with a Macbeth densitometer (RD 918, manufactured by Macbeth).

Blurring

Alphanumerical letters were printed on regenerated paper for PPC (manufactured by Nippon Kakoh Seishi Co., Ltd.). After the printed sheet was allowed to stand for at least 1 hour, the sharpness of the letters and blurring of the ink around the letters were observed under a microscope and with the naked eye.

A . . . Letters are sharp with no blur.

B . . . Letters lack sharpness with slight blur.

C . . . Letters lack sharpness with considerable blur.

Water Resistance

Regenerated paper for PPC (manufactured by Nippon Kakoh Seishi Co., Ltd.) was printed solid with the ink and allowed to stand for at least 1 hour. The printed sheet was immersed vertically in still water for 10 seconds and then pulled up vertically. After spontaneously drying in a room, the optical density of the non-printed white background was measured with a Macbeth densitometer RD918 (manufactured by Macbeth).

Anti-clogging Properties

Alphanumerical letters were continuously printed for 10 minutes by a commercially available ink jet printer (Microbubble Jet Printer BJ-10VL, manufactured by Canon Inc.). The printer was stopped and allowed to stand uncapped at 40° C. and 25% RH for 2 weeks. After the standing, alphanumerical letters were printed again. The number of movements for restoration from clogging that were required for obtaining prints having the same quality as that obtained before standing was examined.

A . . . The initial printing quality is restored by 0 to 2 restoration movements.

B . . . The initial printing quality is restored by 3 to 5 restoration movements.

C . . . The initial printing quality is not restored even after 6 or more restoration movements.

Fixation

OHP sheets for ink jet recording (MJOHPSIN, produced by Seiko Epson Corporation) were printed solid with the ink. The printed surface was reciprocally rubbed 5 times with an eraser (width: 18.5 mm) set at a fixed incline of 45° with a load of 1 kg applied thereto, and the condition of the printed surface was observed with the naked eye.

A . . . The printed surface suffers neither scratch nor peeling.

B . . . The printed surface gets scratches.

C . . . The printed surface is peeling.

EXAMPLES 10 TO 15

An ink for ink jet recording was prepared in the same manner as in Example 9, except for replacing the aqueous ink comprising a polyester suspension prepared in Example 1 with each of the aqueous ink samples comprising a polyester suspension prepared in Examples 2 to 5 and the aqueous ink samples comprising a polyester polyamide suspension prepared in Examples 6 and 7.

The resulting ink was evaluated in the same manner as in Example 9. The results obtained are shown in Table 1.

EXAMPLE 16

The mill base of an aqueous pigment ink obtained in Example 8 was mixed with 1000 g of deionized water and 30 g of Acetylenol EL, and the resulting dispersion was filtered through a 5 μm filter to remove dust and coarse particles to obtain an ink for ink jet recording (average particle size: 0.09 μm).

The resulting ink was evaluated in the same manner as in Example 9. The results obtained are shown in Table 1.

COMPARATIVE EXAMPLE 1

An ink was prepared by using a water-soluble dye commonly used in an ink for ink jet recording according to the following formulation.

| C. I. Acid Yellow | 4 g |
|---|---|
| Ethanolamine | 2 g |
| Diethylene glycol | 10 g |

Preparation of Ink:

| The above dispersion | 50 parts by weight |
|---|---|
| Glycerol | 2.5 parts by weight |
| Diethylene glycol | 10 parts by weight |
| Polyethylene glycol (PEG 300) | 2 parts by weight |
| Acetylenol EL | 0.5 part by weight |
| Deionized water | 35 parts by weight |

TABLE 1

| | | Volue of Product(A) | Average Particle Size (μm) | Surface Tension of Ink (dyne/cm) | Viscosity of Ink (cps) | Degree of Fixation of Ink | Blur of Ink | Water Resistance (Change in Printing Density) White Background Before Immersion | After Immersion |
|---|---|---|---|---|---|---|---|---|---|
| Examples | 9 | 1.4 | 0.02 | 30.2 | 2.4 | A | A | 0.05 | 0.05 |
| | 10 | 7.1 | 0.07 | 33.8 | 3.0 | A | A | 0.05 | 0.05 |
| | 11 | 1.8 | 0.03 | 28.0 | 2.1 | A | A | 0.05 | 0.05 |
| | 12 | 2.6 | 0.04 | 29.5 | 2.2 | A | A | 0.05 | 0.05 |
| | 13 | 0.7 | 0.01 | 31.3 | 2.3 | A | A | 0.05 | 0.05 |
| | 14 | 6.6 | 0.06 | 34.2 | 3.2 | A | A | 0.05 | 0.05 |
| | 15 | 4.3 | 0.05 | 32.9 | 2.6 | A | A | 0.05 | 0.05 |
| | 16 | 7.4 | 0.09 | 33.1 | 2.5 | A~B | A | 0.05 | 0.05 |
| Comparative Examples | 1 | 0 | 0 | 31.8 | 2.0 | A | C | 0.05 | 0.48 |
| | 2 | 11.8 | 0.15 | 31.5 | 2.5 | B~C | A~B | 0.05 | 0.05 |

-continued

| Glycerol | 2.5 g |
|---|---|
| Deionized water | 81 g |
| Acetylenol EL | 0.5 g |

That is, the above components were compounded in a ball mill for 12 hours, and the resulting dispersion was filtered through a 5 μm filter to remove dust and coarse particles to obtain an ink.

The resulting ink was evaluated in the same manner as in Example 9. The results obtained are shown in Table 1.

COMPARATIVE EXAMPLE 2

A pigment ink was prepared under the following conditions and evaluated in the same manner as in Example 9.

Preparation of Pigment Dispersion:

| Styrene-acrylic acid copolymer | 3 parts by weight |
|---|---|
| Triethanolamine | 7 parts by weight |
| Deionized water | 75 parts by weight |

That is, the above components were mixed and heated to about 70° C. to completely dissolve the resin. To the resulting aqueous solution was added 15 parts of a pigment (Phthalocyanine Blue), and the mixture was dispersed under the following conditions.

Dispersing machine: Sandmill
Grinding medium: Glass beads (1.7 mm in diameter)
Packing of grinding medium: 1.5 times by weight
Dispersing time: 2 hours After the dispersing, the glass beads were removed, and the dispersion was filtered through a 5 μm membrane filter to remove coarse particles and dust to thereby obtain a pigment dispersion (average particle size: 0.15 μm).

As is apparent from the results in Table 1, it is understood that the aqueous inks according to Examples (the present invention) in which a dye or a pigment is adsorbed in a suspension of a polyester or a polyester polyamide and the product (A) of which fall within the specific range as specified in the present invention and the aqueous inks having a pigment finely dispersed therein exhibit improvements in all the evaluations of blurring, waterfastness and degree of fixation as compared with inks of conventional formulation (Comparative Examples 1 and 2). Further, the inks were also evaluated as for printing density, ink jetting properties, and properties against clogging of a head, though not shown in Table 1, the inks of Examples proved to be without problems. Among the ink samples of Examples, those of Examples 9, 11, 12, and 13 showed satisfactory results in every evaluation. In particular, the inks of Examples 9 and 13 additionally exhibited superior preservation stability.

Industrial Applicability

The aqueous ink according to the present invention is prevented from blurring and provides prints with improved waterfastness and improved fixation.

Where, in particular, a dye is used, the ink has markedly improved waterfastness and is prevented from blurring. Where a pigment is used, the ink exhibits extremely improved fixation properties on paper, OHP sheets, etc.

A dye or a pigment can be adsorbed easily and efficiently through phase inversion emulsification to thereby provide an ink that is surely prevented from blurring and exhibits further improved waterfastness and fixation properties.

The aqueous ink of the present invention is particularly suitable for an ink jet recording and is also applicable to general writing pens, such as fountain pens, ball-point pens, marker pens, etc.

We claim:

1. An aqueous ink comprising a suspension of particles of a polymer having an adsorbed dye or a pigment, wherein the surface tension ($\gamma$) and the viscosity ($\eta$) of said ink at 20° C. and the average particle size (d) of the suspended particles satisfy the following inequity (1):

$$0.1 \leq \gamma \cdot \eta \cdot d \leq 11 \tag{1}$$

wherein the units of the parameters γ, η and d are dyne/cm, cps, and μm, respectively, said polymer being at lest one member selected from the from the group consisting of a polyester and a polyester polyamide having an acid value of 3 to 100 KOHmg/g as measured according to JIS K 0070 and a glass transition point of not lower than 20° C. wherein said polymer contains in its polymer chain a unit which is an ester of a diol component represented by formula (2):

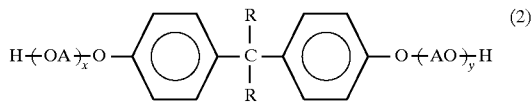

wherein R represents a lower alkyl group having 1 to 4 carbon atoms; A represents an alkylene group having 2 to 4 carbon atoms; and x and y, which may be the same or different, each represent an integer of 1 or greater, the sum of x and y averaging 2 to 7.

2. The aqueous ink according to claim 1, wherein said polymer is a polyester obtained by co-polycondensating the diol component represented by formula (2) and at least one acid component selected from the group consisting of a polycarboxylic acid having two or more carboxyl groups, an acid anhydride thereof, and a lower alkyl ester thereof.

3. The aqueous ink according to claim 1, wherein said polymer is a polyester obtained by co-polycondensating the diol component represented by formula (2), a dimeric acid, and at least one acid component selected from the group consisting of a polycarboxylic acid having two or more carboxyl groups other than said dimeric acid, an acid anhydride thereof, and a lower alkyl ester thereof.

4. The aqueous ink according to claim 1, wherein said polymer is a polyester polyamide obtained by co-polycondensing the diol component represented by formula (2), at least one acid component selected from the group consisting of a polycarboxylic acid having two or more carboxyl groups, an acid anhydride thereof, and a lower alkyl ester thereof, and an amine derivative.

5. The aqueous ink according to claim 1, wherein said ink further contains an anionic dispersant represented by formula (3)

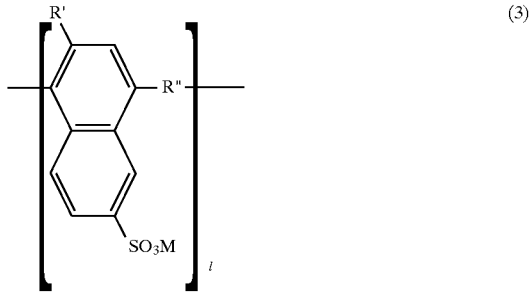

wherein R' represents a hydrogen atom, a hydrocarbon group having 1 to 10 carbon atoms or a hydroxyl group; R" represents a hydrocarbon group having 1 to 5 carbon atoms; M represents a monovalent cation; and l represents an integer of 1 to 1000.

6. The aqueous ink according to claim 5, wherein said anionic dispersant is a polymeric dispersant.

7. An ink-jet-recording aqueous ink comprising the aqueous ink according to claim 1.

8. A process for producing the aqueous ink according to claim 1 comprising the steps of:

adding the polymer to a solvent together with the dye or pigment;

adding a neutralizing agent to ionize the carboxyl groups of the polymers;

adding water to the system; and evaporating the solvent to induce phase inversion into an aqueous system.

* * * * *